United States Patent [19]
Kikinis

[11] Patent Number: 5,631,847
[45] Date of Patent: May 20, 1997

[54] SYSTEM FOR NETWORK FILE SERVER FAILURE NOTIFICATION

[75] Inventor: Dan Kikinis, Saratoga, Calif.

[73] Assignee: Elonex I.P. Holdings, Ltd, London, England

[21] Appl. No.: 429,802

[22] Filed: Apr. 27, 1995

[51] Int. Cl.$^6$ .................................................... G06F 17/00
[52] U.S. Cl. ............................................................ 364/514 R
[58] Field of Search .................... 354/514 R, 579, 354/580; 395/185.01, 185.1, 183.22, 2.83

[56] References Cited

U.S. PATENT DOCUMENTS

| | | | |
|---|---|---|---|
| 3,478,324 | 11/1969 | Couleur et al. | 395/185.02 |
| 3,778,767 | 12/1973 | Carlyle et al. | 395/185.1 |
| 5,062,147 | 10/1991 | Pickett et al. | 395/185.1 |
| 5,347,646 | 9/1994 | Hirosawa et al. | 395/185.02 |
| 5,363,493 | 11/1994 | Unverrich | 395/185.1 |
| 5,423,025 | 6/1995 | Goldman et al. | 395/185.1 |

*Primary Examiner*—Ellis B. Ramirez
*Attorney, Agent, or Firm*—Donald R. Boys

[57] ABSTRACT

An error notification system operated independently of a connected computer receives signals indicating an error condition in operation of the computer, matches the signal with a prerecorded message, and dials phone numbers from a priority list of responsible parties. When a call is answered, the notification system announces the message, informing the answering agent of the error condition, and requests a response requiring a person. If the requested response is not given, the system dials the phone number next in priority, and so on, until a person answers and provides the human response. The system is applied to networked computers, such as file servers, and in one embodiment, the answering party can initiate corrective action.

23 Claims, 6 Drawing Sheets

SYSTEM FOR NETWORK FILE SERVER FAILURE NOTIFICATION

FIELD OF THE INVENTION

The present invention is in the area of networked computer systems, and pertains more specifically to apparatus and methods for notifying administrators in the event of system fault conditions.

BACKGROUND OF THE INVENTION

Operating systems for managing computer operations in a network typically include one or more control routines by which a file server may send a message to a system administrator if an error or failure occurs in operation of the file server. On some occasions, however, such a message may not reach the system administrator immediately. For example, an error condition may render the server unable to send the message, or the system administrator may not be available to receive the message. A failure to communicate an error condition may lead to downtime, the effects of which could vary from simply annoying to disastrous.

What is needed is a system for notification of file server error that is persistent and automatic, and will not fail if a file server fails. Such a failure-proof notification system should go beyond the confines of the file server system, if necessary, to reach and notify appropriate authorized personnel.

SUMMARY OF THE INVENTION

In a preferred embodiment, an error notification system for a computer is provided, comprising a CPU for managing operations of the error notification system; a memory comprising stored data and error notification control routines executable by the CPU; a telephone modem; a message device for rendering a message file in audio form and providing the message to the telephone modem via an audio signal connection; a communication bus connecting the CPU, the memory, the message device, and the telephone modem; and a communication link from the CPU to the computer; wherein the CPU, executing the error notification routines, upon receiving an error signal from the computer via the communication link, dials a sequence of prestored telephone numbers in order, recites a message in the event a call is answered, and elicits a response from an answering party, and ends the calling sequence on receipt of a correct response. In one embodiment, the system is implemented as an expansion board for engaging a slot on an expansion bus of the computer, and the communication link from the CPU to the computer is the expansion bus. In another embodiment the error notification system is implemented as a stand-alone device, and the communication link from the CPU to the computer is one of a conventional serial port or a parallel port of the computer, the error notification system comprising a compatible port for the link.

The message device can be any of several types, such as a tape recorder, but digital recording and voice synthesis is preferred. There can be several messages associated with several different types of error conditions, and the system matches error conditions with the correct messages.

The system according to various embodiments of the invention is particularly applicable to networked computer systems, such as file servers. In an alternative embodiment the system also monitors network communication for appropriate responses. In some embodiments, a transaction record is compiled during operations of the system. In some embodiments, an answering party can initiate corrective action when notified of an error condition.

A singular advantage of the error notification system according to various embodiments of the invention, is that it requires a human response when making a notification, which assures that a responsible party, not an answering machine or a party ignorant of the system, is notified of the error. Transaction recording goes further in assuring responsibility.

DESCRIPTION OF THE PREFERRED EMBODIMENTS

Figure 1:
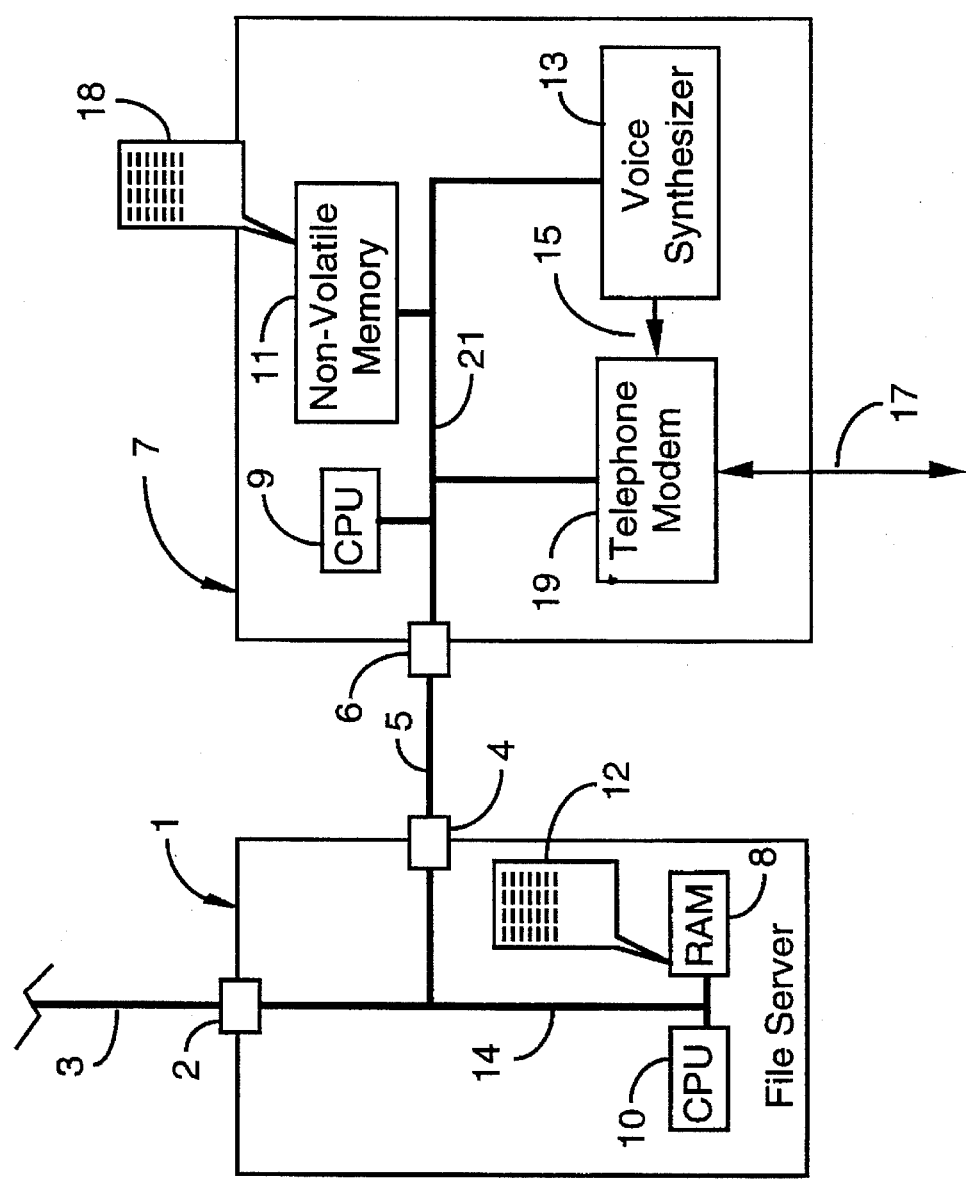
FIG. 1 is a block diagram showing a file server error notification system according to an embodiment of the present invention.

FIG. 1 is a block diagram of an error notification system 7 according to a preferred embodiment of the present invention, connected to a file server 1 in a computer network. Error notification system 7 is connected by a communication link 5 via ports 4 and 6 to file server 1, which is in turn connected in a network over network cabling 3 via a network port 2.

File server 1 may be any of a number of file servers connected in any of a broad variety of network systems known in the art and has control routines 12 which monitor status and report error conditions to error notification system 7. These control routines are stored in a memory 8 and are executable by a controller 10 in the file server.

It is not uncommon for file servers, as such, to have routines for monitoring and reporting error conditions, and in some embodiments of the present invention, existing monitoring and reporting routines may be used. In preferred embodiments, however, routines 12 are unique to the invention.

The controller, memory, and ports 2 and 4 are connected by a communication bus 14 in the file server. It will be evident to those with skill in the art that there may be many other elements and devices also connected on bus 14.

Error notification system 7 may be physically mounted within the framework of file server 1, or may be a stand-alone device externally connected. In the former instance, the error notification system may be implemented as an expansion board, and may plug into an expansion slot in the file server.

In other embodiments, error notification system 7 may be connected to the file server by a serial link, a parallel link, such as a standard parallel port, or may by any other digital communication link.

Controller 10 in the file server may be either the CPU of the file server or a dedicated controller for the purposes of the present invention, and memory 8 may be a memory unit dedicated to the invention, or a memory unit typical to such a file server. It is only the control routines 12 that are specific to the present invention in some embodiments, as the physical elements are common to file servers, even to communication port 5, which may be a serial or parallel port commonly included with such file servers.

The purpose of control routines 12 is to provide for transmission of status conditions, detected errors and failure conditions, and, in some instances, to provide control for executing instructions that might be received from error notification system 7.

In some embodiments, even those wherein the error notification system is installed within the file server, the error notification system may be separately powered, therefore not vulnerable to failure of file server 1, and may continue to operate even in the event of total failure of file server 1.

Error notification system 7 comprises a central processing unit (CPU) 9 for controlling operations of the error notification system, and CPU 9 executes control routines 18 stored in a non-volatile memory 11. The CPU may take any of several forms, such as a commercially available microprocessor of an application-specific microcontroller. In some cases this memory may be other than a non-volatile memory, but non-volatile is preferred, so there is no need to reprogram, or to reload control routines 11 in the event of a power failure.

There is also a telephone modem 19 in the error notification system for communicating over telephone phone lines 17, and a voice synthesizer 13 for synthesizing pre-recorded voice messages in a unique process for notifying responsible parties contacted over telephone line 17 of status and error or failure conditions of file server 1 and/or systems in communication with file server 1 over net link 3.

Voice synthesizer 13 is connected to telephone modem 17 by an analog audio cable 15. A communication bus 21 connects each of the digital elements of the error notification system described above. It will be apparent to those with skill in the art that there are a number of suitable controllers, memories, voice synthesizers, modems, and bus structures that are available in the art, and might be used for the error notification system.

Upon receiving notification of an error condition from file server 1 processor 9 executes control routines 18 stored in memory 11. In a minimum embodiment the notification will be simply a signal that an error exists or has occurred, without differentiation of any sort, that is, without any further information concerning the nature of the fault. In a preferred embodiment, however, there will be some differentiation in fault conditions, and there will be a different error signals sent in different instances.

Figure 5A:
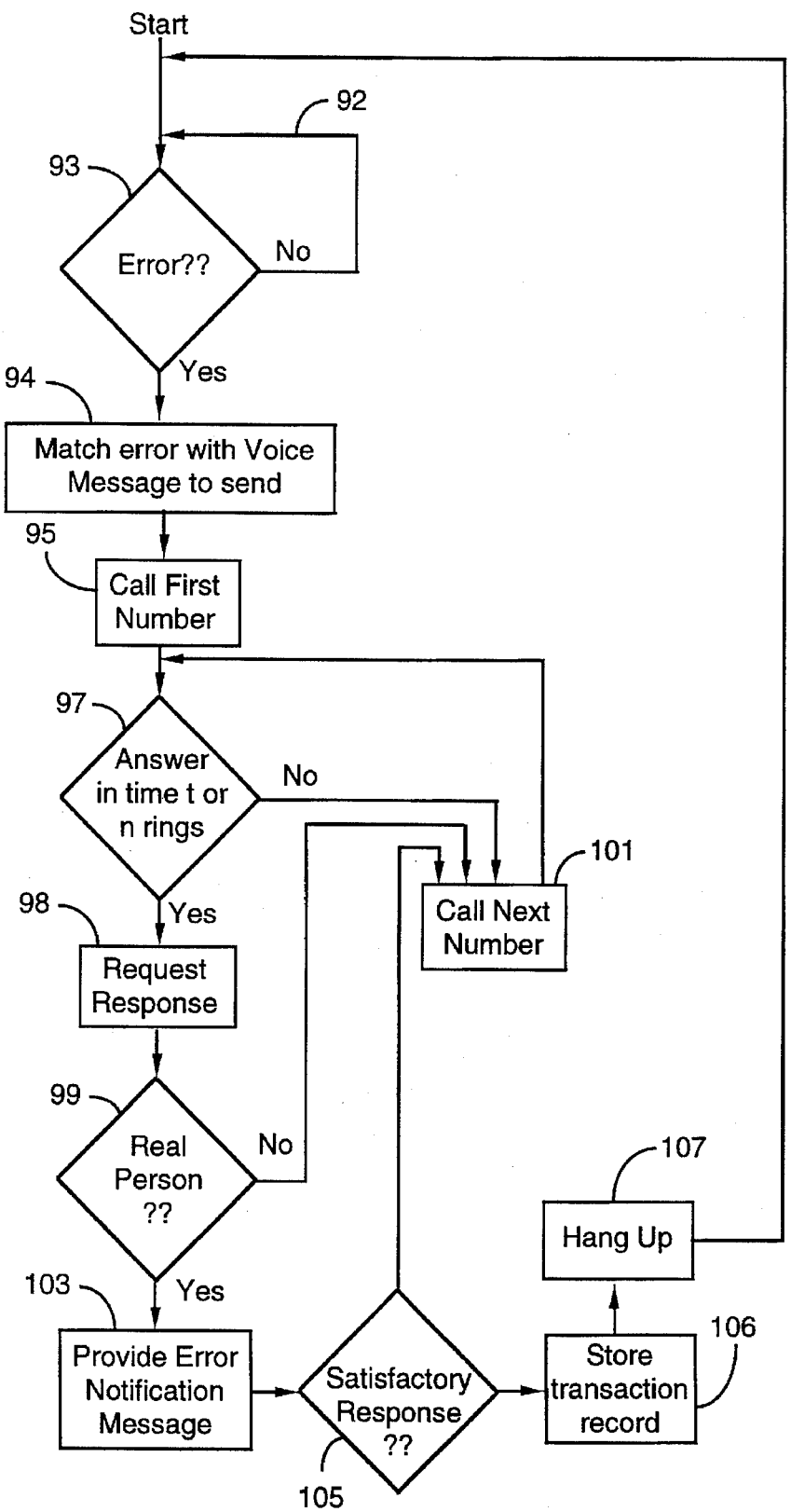
FIG. 5A is a logic flow diagram illustrating a step-by-step process according to an embodiment of the invention, for notifying a responsible party of an error condition in a monitored computer.

A step-by-step process according to an embodiment of the invention for notifying a responsible party in the event of an error condition is illustrated by the flow diagram on FIG. 5A.

At decision step 93, the system monitors for an error signal from the file server. If there is no error (path 92) control loops back to decision 93, until there is an error signal.

Once an error message is received, control goes to step 94, where the error signal is matched with a pre-stored voice message. In a preferred embodiment, the pre-recorded voice message is a digital message, and the digital form is used to synthesize an audio voice message via synthesizer 13 (FIG. 1). Audio recording may be used in some embodiments, however.

Once the voice message is selected, a dial routine selects and dials a first prestored telephone number. In a preferred embodiment, several numbers are stored, each number being the number of a responsible party who is aware of his or her inclusion in the process, and who is authorized to deal with and correct errors in the network. Typically the calling list is organized by some agreed-to priority. The procedure of selection of the first number from a stored priority list is a common procedure, which may be implemented by one with skill in the programming arts.

A first call is placed at step 95. The calling routine is programmed to operate for either a certain number of rings or a certain length of time without an answer before exiting the first call. If there is no answer within the ring or time window, control goes to step 101, and the telephone number next in priority is called, after which control goes back to decision step 97 again to monitor for time or number of rings.

In the event that the first or any subsequent call is answered, control goes to step 98, at which step a first portion of the voice message selected at step 94 is announced over the telephone link. The purpose of the first portion of the voice message is to request a specific response from the answering agent. The request may be for a voice answer, in which case there needs be a voice recognition element in the notification system, and such elements are known in the art.

In a preferred embodiment, the initial portion of the message will say, for example, "A problem has been detected in computer system XX, and this message is to notify you of the difficulty. If you are the responsible party to receive this information, please press the numeral 1 on your phone keypad. If not, please hang up now." It will be apparent to those with skill in the art that the message may take a wide variety of forms without departing from the spirit and scope of the invention. A period of time is allotted for the appropriate response at this point, just as a reasonable period of time is allotted at point step 95 for a call to be answered.

It has been anticipated by the inventor that some calls will be answered by machine, or by persons other than the responsible party, and the request for a specific tone response is to deal with this circumstance. If the appropriate response (step 99) is not made within a programmed time or number of rings, just as at step 97, control goes again to step 101, and the next number is selected.

This portion of the decision path is an important feature of the present invention. By this decision path, a responsible person will surely be contacted about the fault detected in the computer system monitored, rather than just, perhaps, a message left on an answering machine.

Looping down the calling priority list of responsible people is continued in the fashion described until a responsible party makes the appropriate response, as described above, then control goes to step 103. At this step a second portion of the recorded message is provided. This second portion deals with the nature of the fault condition, and is a part of the message by virtue of the selection procedure at step 94, assuming there is such a step. As described above, in a minimum implementation, there will be no differentiation, just an indication that an error has occurred.

Assuming that there is differentiation, the second portion of the message is played, and the nature of the error condition is relayed to the responsible party. In some embodiments this is considered sufficient, and the system hangs up at this point (directly to step 107, no step 105). In a preferred embodiment, however, another response step is implemented at step 105, and the answering party is requested to provide another response indicating that she or he has understood the message and agrees to take appropriate action. This response, as in step 99, can be in the form of pressing a key, a key series, or a voice response if appropriate elements are included to handle voice responses.

It will be apparent to those with skill in the art that the order of the steps and the number of responses requested may vary from the example described, but that the inclusion of a response step to assure that the information reaches the responsible party is a very important aspect of the invention.

In some embodiments, a recording element at the notification system is activated to record a voice message from the called party. In a preferred embodiment, there is a transaction sub-system that records the activity of the notification system, and stores the result. This storage can be in dedicated registers of non-volatile memory 11, in a small RAM portion dedicated to the purpose, in a hard disk or floppy drive connected to the system or the file server, or in another memory. The transaction and recording system may be implemented in a variety of ways, as will be evident to those with skill in the art. This transaction recording process is represented by step 106. At the end of the notification process, in all of the embodiments, the system hangs up (step 107) and goes back to a monitoring mode. A possible circumstance is that no responsible individual was actually notified in all of the calling priority list, but the probability of a successful outcome is very much higher than for prior art systems.

Figure 5B:
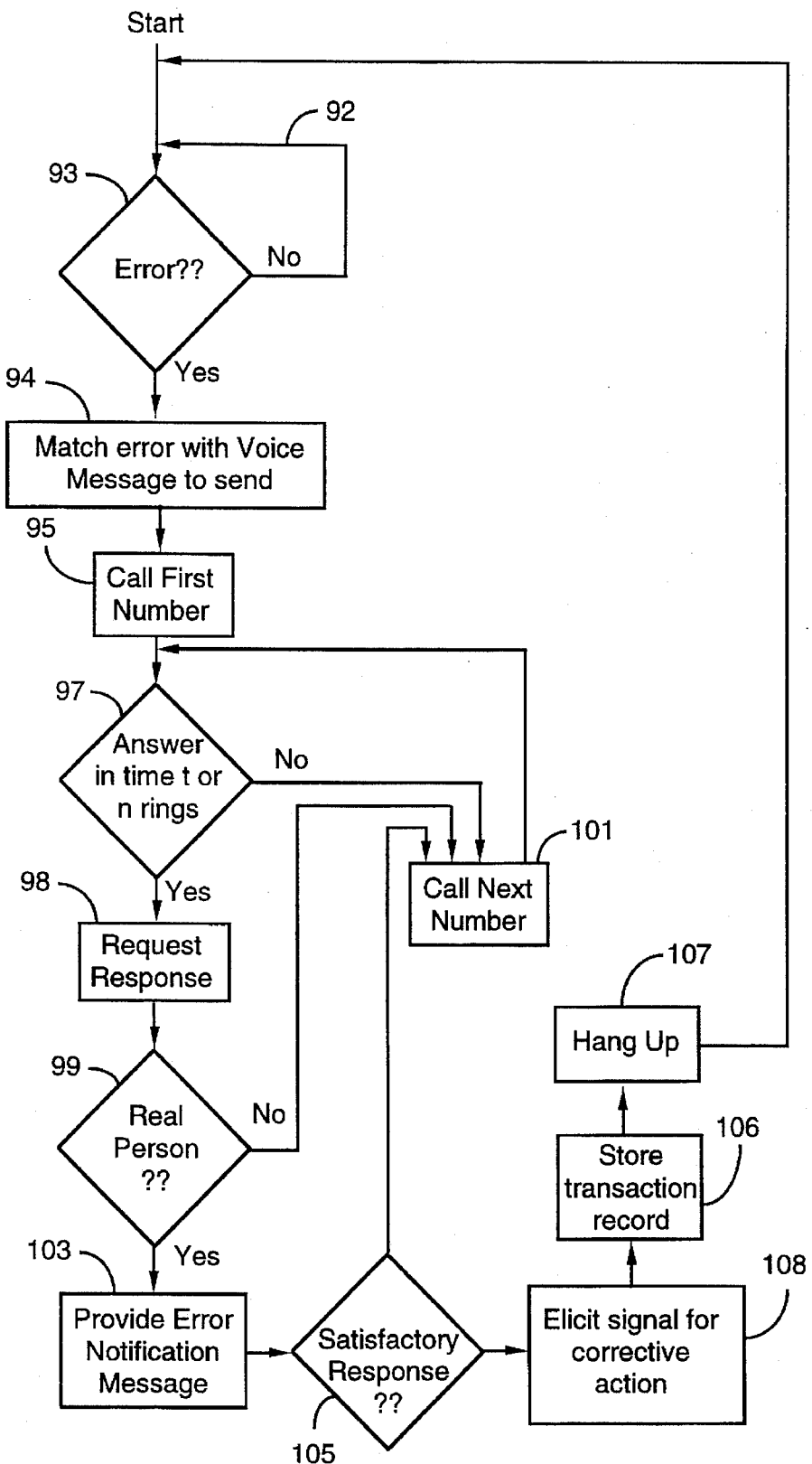
FIG. 5B is a logic flow diagram as in FIG. 5A, depicting a step for providing a called party an opportunity to initiate corrective action for a notified error condition.

FIG. 5B is a logic flow diagram depicting decision and process flow according to an alternative embodiment of the invention. In the embodiment shown by FIG. 5B, provision is made at an additional step 108 for accepting command response from a responsible party in an effort to correct an error condition for file server 1. In this embodiment, control routines 18 (FIG. 1) executed by microcontroller 9, have routines for commanding file server 1 in specific ways predetermined to overcome certain error conditions that might be detected and communicated to error notification system 7.

An example of a correction technique is reboot. It is well known in the computer arts that many errors can be corrected by simply triggering a reboot signal, which causes the rebooted device (file server 1) to "start over" and reload the BIOS and operating system, and in some instances, other operating instructions. Reboot, which can, in some instances, be done by momentarily interrupting power at some point in the system, is then a viable correction technique for many error conditions, and is one technique programmed in routines 18, which a responsible party could cause to be activated by remote input.

It will be apparent to those with skill in the art that there are a variety of ways that a responsible party, notified of a specific error by the error notification system, might cause an error correction procedure prestored in the error notification system to be activated. In one simple method the notification system may simply inform the responsible party contacted of the available routines that have been prestored and correlated with specific error signals, and asks the party to select by pressing a particular number or letter on the keypad.

Figure 2:
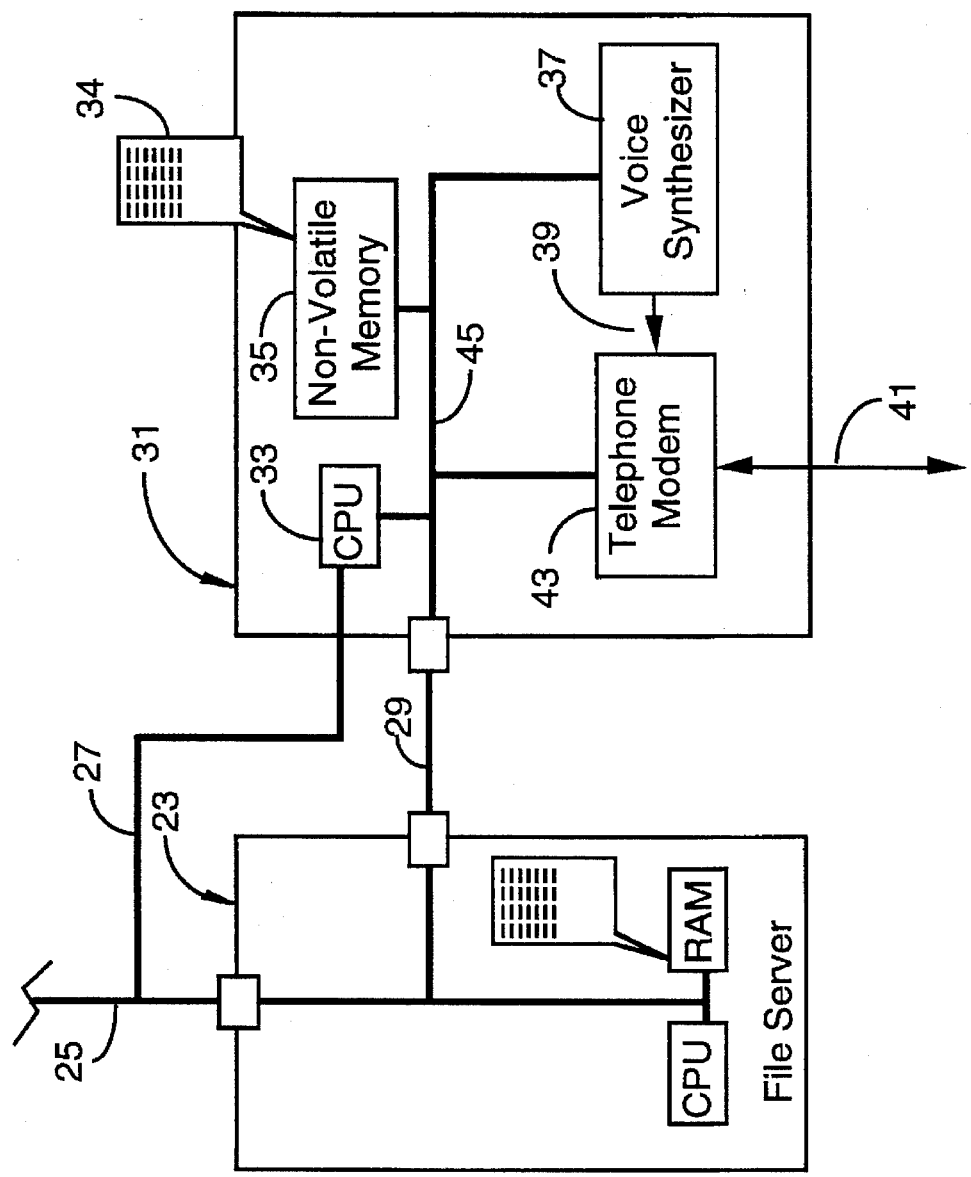
FIG. 2 is a block diagram of an error notification system according to an alternative embodiment of the present invention.

FIG. 2 is a block diagram of an error notification system according to an alternative embodiment of the present invention. The embodiment shown in FIG. 2 is similar to the embodiment described with reference to FIG. 1 but has the added fail-safe feature of monitoring file server inputs and checking server responses for appropriateness to the inputs. This embodiment is essentially a real-time file server operations analyzer. It continuously monitors network traffic to and from the server and declares an error condition when server actions are not according to preprogrammed specifications stored in non-volatile memory 35.

In the embodiment of FIG. 2 error notification system 31 comprises a CPU 33 that monitors file server 23 network cabling 25 via a network connection 27. The CPU also monitors the server status output via communication link 29. A comparison is made of the status conditions received from the server against the calculated status based on server analysis algorithms stored in the non-volatile memory 35.

If an error condition in the server is detected, error notification control routines 34 stored in memory 35 are executed. These routines are the same as routines 18 described above relative to the embodiments of FIG. 1. There are, in this embodiment, a telephone modem 43 connected to telephone line 41, and a voice synthesizer 37, and the digital elements have an internal bus 45. The voice synthesizer is connected to the modem by an analog audio line 39.

Figure 3:
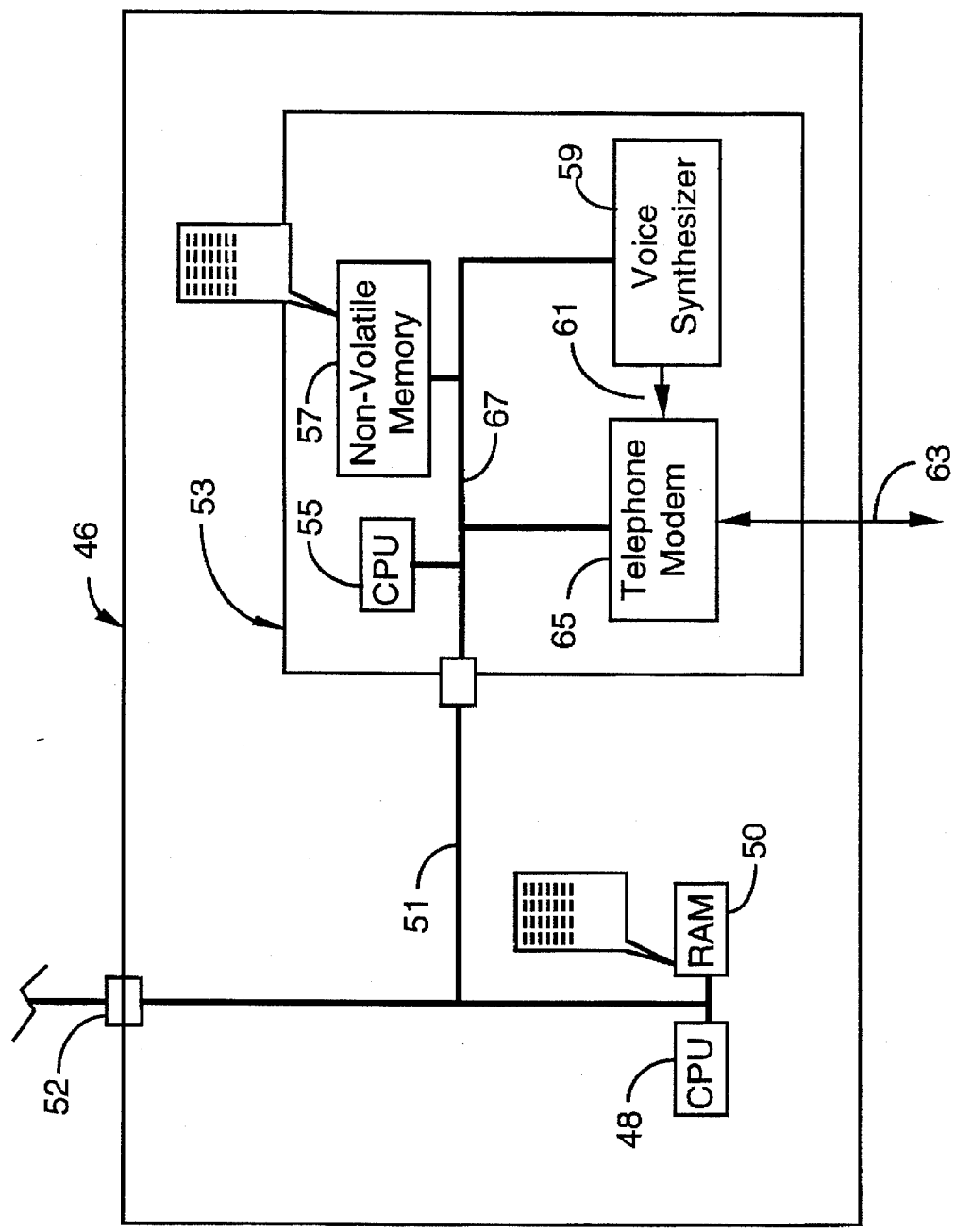
FIG. 3 illustrates an embodiment of the invention wherein the error notification system is implemented as an expansion board.

FIG. 3 illustrates an embodiment of the invention wherein the error notification system is implemented as an expansion board 53 in a file server 46, comprising a CPU 55, a memory 57, a voice synthesizer 59, and a telephone modem 65. The modem is connected to a telephone line 63, and the internal digital elements are connected by a bus 67. There is an analog audio line 61 from the voice synthesizer to the modem.

The file server in this example has a CPU 48, a memory 50, a network port 52, and other typical elements not shown, the nature of which, as will be evident to those with skill in the art, may vary according to the functions of the server. These are connected by a bus 51, which also connects to expansion board 53, the error notification system.

Figure 4:
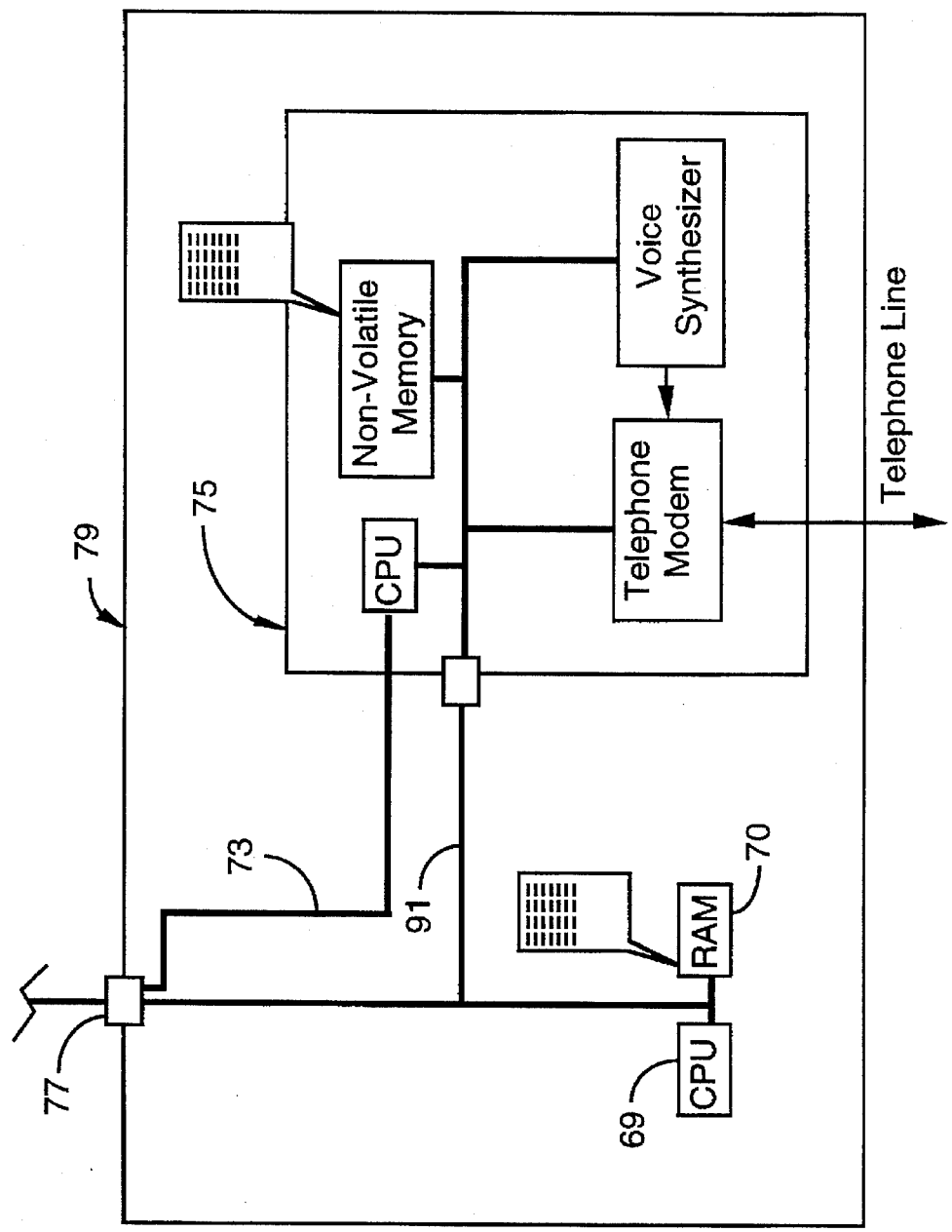
FIG. 4 illustrates an error notification system implemented as an expansion board and monitoring network communications.

FIG. 4 illustrates an error notification system 75, having substantially the structure of those already described, implemented as an expansion board 75 and connected to bus 91, which also connects CPU 69, memory 70, and network port 77, which are parts of file server 79. The error notification system in this embodiment provides the extra function of monitoring network communications via internal netlink 73 to network port 77. Operation is substantially that described above with reference to FIG. 2.

It will be apparent to those with skill in the art that there are many alterations that might be made to the embodiments described without departing from the spirit and scope of the invention. For example, there are many sorts of networks for which the system according to embodiments of the invention may be useful. There are also many sorts of file servers that may be generically represented by the file servers described above. There are likewise many design choices that might be made in providing an error notification system functioning as described for the present invention, which would be somewhat different than those herein described. These design choices are within the scope of the invention.

What is claimed is:

1. An error notification system for a computer, comprising:

a CPU for managing operations of the error notification system;

a memory;

a telephone modem;

a message device for rendering a message file in audio form and providing the message to the telephone modem;

a communication bus connecting the CPU, the memory, the message device, and the telephone modem;

a communication link adapted for connecting the CPU to the computer;

a list of telephone numbers stored in the memory with each assigned a position in a priority calling sequence;

a pre-programmed response; and a calling control routine stored in the memory and executable by the CPU;

wherein the calling routine, on detecting an error by the computer, calls the highest priority telephone number, requests the pre-programmed response if the call is answered, hangs up and calls the next number in order in the event that the pre-programmed response is not given in a preset time, and continues to call the telephone numbers in sequence until either the correct response is given or the end of the calling list is reached.

2. An error notification system as in claim 1, wherein the error notification system is implemented as an expansion board for engaging a slot on an expansion bus of the computer, and wherein the communication link from the CPU to the computer is the expansion bus.

3. An error notification system as in claim 1 wherein the error notification system is implemented as a stand-alone device, and the communication link from the CPU to the computer is one of a conventional serial port or a parallel port of the computer, the error notification system comprising a compatible port for the link.

4. An error notification system as in claim 1 wherein the message device is a voice recorder having prerecorded messages recorded thereon.

5. An error notification system as in claim 1 wherein the message device is a voice synthesizer, and prerecorded messages are digitally recorded messages stored in the memory of the error notification system.

6. An error notification system as in claim 1 further comprising plural stored messages, and wherein the CPU, executing the control routines, matches a received error signal with a unique one of the plural stored messages.

7. An error notification system as in claim 1 wherein the computer is a file server in a network of computers.

8. An error notification system as in claim 7 additionally comprising a network port and link to the network connecting the computers, and the CPU monitors network communications for appropriate responses and actions.

9. An error notification system as in claim 1 wherein the CPU compiles a retrievable transaction record for all calls placed and answered in each instance of an error signaled by the computer.

10. An error notification system as in claim 1 further comprising a control routine for commanding, via the communication link, at least one action by the computer to correct a signaled error condition, and wherein a called party may trigger the at least one action by input to the error notification system via the telephone modem.

11. An error tracking and announcing computer system, comprising:

a computer having a first CPU, a first memory, and a communication port; and an error notification system comprising a second CPU for managing operations of the error notification system, a second memory, a telephone modem; a message device for rendering a message file in audio form and providing the message to the telephone; a communication bus connecting the CPU, the memory, the message device, and the telephone modem; a communication link adapted for connecting the CPU to the computer; a list of telephone numbers stored in the memory with each assigned a position in a priority calling sequence; a pre-programmed response; and a calling control routine stored in the memory and executable by the CPU; wherein the calling routine, on detecting an error by the computer, calls the highest priority telephone number, requests the pre-programmed response if the call is answered, hangs up and calls the next number in order in the event that the pre-programmed response is not given in a preset time, and continues to call the telephone numbers in sequence until either the correct response is given or the end of the calling list is reached.

12. An error tracking and announcing computer system as in claim 11, wherein the error notification system is implemented as an expansion board for engaging a slot on an expansion bus of the computer, and wherein the communication link from the second CPU to the computer is the expansion bus.

13. An error tracking and announcing computer system as in claim 11 wherein the error notification system is implemented as a stand-alone device, and the communication link from the second CPU to the computer is one of a conventional serial port or a parallel port of the computer, the error notification system comprising a compatible port for the link.

14. An error tracking and announcing computer system as in claim 11 wherein the message device is a voice recorder having prerecorded messages recorded thereon.

15. An error tracking and announcing computer system as in claim 11 wherein the message device is a voice synthesizer, and prerecorded messages are digitally recorded messages stored in the memory of the error notification system.

16. An error tracking and announcing computer system as in claim 11 wherein there are plural stored messages, and wherein the second CPU matches a received error signal with a unique associated message.

17. An error tracking and announcing computer system as in claim 11 wherein the computer is a file server in a network of computers.

18. An error tracking and announcing computer system as in claim 17 additionally comprising a network port and link to the network connecting the computers, and the second CPU monitors network communications for appropriate responses and actions.

19. An error tracking and announcing computer system as in claim 11 wherein the second CPU compiles a retrievable transaction record for all calls placed and answered in each instance of an error signaled by the computer.

20. An error tracking and announcing computer system as in claim 11 further comprising a routine for commanding, via the communication link, at least one action by the computer to correct a signaled error condition, and wherein a called party may trigger the at least one action by input to the error notification system via the telephone modem.

21. A notification process for informing a responsible party of an error occurring in operation of a computer, comprising steps of:

(a) signaling an error condition from the computer to an error notification system having a CPU separate from the computer over a communication link;

(b) matching the error signal in the error notification system with a prerecorded message;

(c) selecting a next phone number of a party to be notified from a priority list of phone numbers, and dialing the number via a telephone modem, the next number being the highest priority number not yet dialed since step (b) was executed;

(d) announcing the prerecorded message if the dialed line is answered;

(e) requesting a response requiring an action by a person;

(f) going back to step (c) if the required response is not given; and (g) ending the notification process if the required response is given.

22. The method of step 21 wherein the computer is a file server connected in a computer network.

23. The method of claim 21 further comprising a step for an answering party to initiate one or more correction actions in response to the announced prerecorded message.

* * * * *